July 30, 1940.   W. W. STUART   2,209,941
TEMPERATURE CONTROL SYSTEM
Filed Nov. 4, 1935
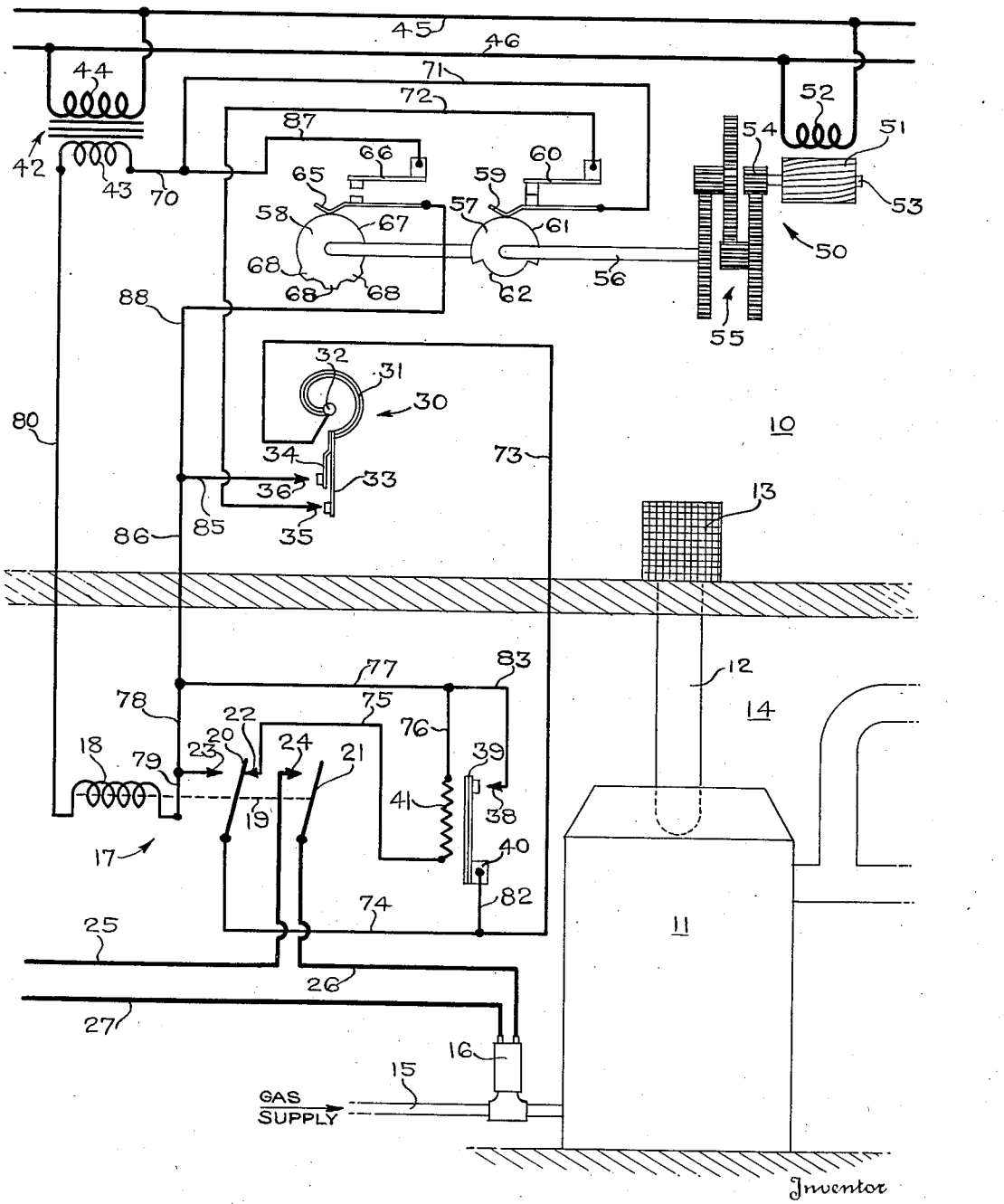
Inventor
William W. Stuart
By George H Fisher
Attorney Patented July 30, 1940

2,209,941

UNITED STATES PATENT OFFICE 2,209,941

TEMPERATURE CONTROL SYSTEM

William W. Stuart, Des Moines, Iowa, assignor to Minneapolis-Honeywell Regulator Company, Minneapolis, Minn., a corporation of Delaware Application November 4, 1935, Serial No. 48,126

14 Claims. (Cl. 236—46)

The present invention relates to sensitive and delicate control systems, particularly of the electrical type. While the system of the present invention has general utility, it has been particularly designed for use in temperature control systems, such as the control of heating systems for domestic uses.

One of the objects of the invention is the provision of a sensitive electrical control system wherein both a sensitive and delicate control switch and a starting switch must be closed in order to energize a controlled device, the arrangement being such that closure of the control switch causes closure of the starting switch so that energization of the device to be controlled is a direct result of the closing of the control switch.

In the preferred form of the invention, the starting switch is controlled by time delay means that takes the form of a thermal electric timer energized by closure of the control switch whereby the device to be controlled is energized a timed period after closing of the control switch. Also, in the preferred arrangement, energization of the device to be controlled is thereafter controlled directly by the control switch without relation to the condition of the time switch or starting switch.

Another object of the invention is the provision of a sensitive condition responsive control system wherein a first condition responsive switch, that is closed at one value indirectly energizes a device to be controlled by causing a separate starting switch to be closed and also controls the device to be controlled directly through the medium of a second control switch that closes at a different value of the condition.

Another object of the invention is the provision of a temperature control system in which a temperature changing device is operated under thermostatic control during certain periods, such as during the day-time, the thermostatic control being rendered inoperative during other periods of time, such as during the night, and the temperature changing device being operated intermittently during those periods wherein the thermostatic mechanism is out of control.

Another object of the invention is the provision of a temperature control system which is operated intermittently at certain periods as during the night and is operated thermostatically throughout another period, as during the day, through the medium of a thermostatic control switch of sensitive and delicate nature which has associated therewith a starting switch that is closed thereby through a timing mechanism, the arrangement being such that the starting switch must be closed before the thermostatic switch is able to operate the temperature changing device.

Another object of the invention is the provision of a sensitive control system wherein an electrical device that it is desired to control is energized by the cooperative action of a control switch and a starting switch, the starting switch being operated by time delay means which is placed in operation by the control switch, and varying the time period required for operation of the timing switch.

Another object of the invention is the provision of a temperature control system whose action is varied upon changes in external atmospheric conditions, such variations being obtained by the use of a temperature responsive device that is located in the atmosphere surrounding a temperature changing mechanism, the variation in the control action of the system being obtained indirectly upon fluctuations in external conditions due to the fact that the atmosphere surrounding the temperature changing device tends to be maintained at different temperatures by reasons of varying periods of operation of the temperature changing device as the value of the external temperature changes.

Other objects of the invention include various combinations and sub-combinations of the arrangements set forth above and will be found in the description, the drawing, and the claims.

For a more complete understanding of the invention, reference may be had to the following detailed description and the single drawing which diagrammatically illustrates one form of the present invention.

Referring to the single drawing, a space whose temperature it is desired to control is indicated at 10. This space 10 may take the form of a building, house, or a single room. Associated with the space 10 is a temperature changing device 11 herein shown in the form of a warm air furnace which is connected to the space 10 through the medium of a duct 12 and a register 13. This furnace 11 is located in a separate space, indicated 14, which may well be the basement of the building of which the space 10 forms a part. The furnace 11 may be fired in any suitable manner and is herein shown as fired by gas the gas being supplied by a pipe 15 with which there is associated an electrically operable gas valve 16.

The gas valve 16 is controlled by a relay generally indicated at 17 which comprises a relay coil 18, an armature 19, and switch arms 20 and 21. When the relay coil 18 is deenergized, switch arm 20 engages a contact 22. Upon energization of relay coil 18, switch arm 20 disengages contact 22 and moves into engagement with a contact 23. Likewise, upon energization of relay coil 18, switch arm 21 moves into engagement with an associated contact 24. Switch arm 21 and contact 24 control a circuit for gas valve 16 as follows: line wire 25, contact 24, switch arm 21, wire 26, gas valve 16, and line wire 27. As a result, it will be evident that whenever relay coil 18 is energized, gas valve 16 is energized and moves to open position to supply gas to the furnace 11 whereupon heat is delivered to the room or space 10.

The relay 17 is controlled during certain periods, as during the day or during working hours, by means of a sensitive temperature responsive device, indicated generally at 30 which is herein shown as responding to the temperature of the room or space 10. This temperature responsive device or room thermostat 30 includes a sensitive bimetallic element 31 which has one of its ends secured as at 32. Secured to the other or free end of this bimetallic element 31 is a pair of contact blades 33 and 34 which cooperate with associated contacts 35 and 36. The arrangement is such that upon a fall in the temperature to which bimetallic element 31 responds, contact blade 33 first engages contact 35 and thereafter, upon a further fall of say 2° F., contact blade 34 engages contact 36.

The contact blade 33 and associated contact 35 comprise a first control switch. It will be evident that this contact blade and contact engage very lightly and are therefore subject to disturbances, such as vibration, when the temperature is such that the contact blade 33 is just barely engaging contact 35. Therefore, if this contact blade and associated contact, in and of themselves were capable of energizing relay coil 18, it will be apparent that under many conditions the circuit to relay coil 18 would be rapidly made and broken so that the armature 19 would be repeatedly attracted in a short period of time, thereby resulting in what is commonly termed "relay chatter." In order to obviate this difficulty without unduly sacrificing sensitivity of the control system, I provide a starting switch that must be closed in order for the contact blade 33 and associated contact 35 to energize the relay coil 18. This starting switch comprises a contact 38 and a bimetallic strip 39 which has one of its ends secured as indicated at 40. This bimetallic strip 39 is adapted to be heated by an associated electrical heater 41. In addition, the bimetallic strip 39 is located in the space or basement 14 and may be located relatively close to the heater 11 wherefor it is influenced, to a certain extent, by the temperature of the basement 14 or the temperature of the atmosphere surrounding the heater 11.

Electrical power is furnished to the relay coil 18 and electrical heater 41 by a step-down transformer 42, having a low voltage secondary 43 and a high voltage primary 44. This primary 44 may be connected to any suitable source of power and is herein shown as being connected to line wires 45 and 46.

As pointed out above, control of relay coil 18 by the thermostatic mechanism 30 is prevented during certain periods and, during this time, the relay coil 18 is energized intermittently. This is accomplished by means of a timing mechanism generally indicated at 50. This timing mechanism includes any suitable type of motor means which is shown herein as comprising an induction motor having a rotor 51 and an associated field winding 52. This field winding 52 may be connected to any suitable source of power and is herein shown connected to the line wires 45 and 46. Rotor 51 is provided with a rotor shaft 53 which carries a pinion 54. The pinion 54 forms a part of a torque amplifying and speed reducing gear train 55 by means of which a main operating shaft 56 is coupled to the rotor shaft 53. Secured to main operating shaft 56 are cams 57 and 58.

The cam 57 controls a switch comprised by movable switch arm 59 and a stationary switch arm 60. This cam 57 is provided with a relatively long dwell 61, having a relatively large radius, the length of the dwell corresponding to the number of hours or time period during which it is desired to control the relay coil 18 by the thermostatic mechanism 30. The cam 57 is further provided with another dwell 62 of shorter radius, the length of this dwell corresponding to the number of hours or period during which it is desired to prevent control of the relay coil 18 by the thermostatic mechanism 30. It will be evident that when the movable switch arm 59 is riding upon the dwell 61, the switch arms 59 and 60 will be held in engagement, as shown. On the other hand, when the switch arm 59 rides upon the dwell 62, the switch arms 59 and 60 will be separated.

The cam 58 operates a similar switching mechanism that includes a switch arm 65 which is movable and a relatively stationary switch arm 66. This cam 58 is provided with a dwell 67, having a relatively short radius and the length of this dwell corresponds to the length of the dwell 61 of the cam 57. In addition, the cam 58 is provided with a plurality of upraised portions or fingers 68 which cover a portion of cam 58 that corresponds to the portion of cam 57 comprised by dwell 62. When the switch arm 65 is riding upon dwell 67, the switch arms 65 and 66 are separated. On the other hand, engagement of switch arm 65 by any one of the fingers 68 causes movement of switch arm 65 into engagement with switch arm 66.

With the parts in the position shown, it is evident that it is desired to control the temperature of the space 10 by the thermostatic mechanism 30 since the switch arm 59 is engaging switch arm 60. Also, the temperature of the space 10 is at or above its desired temperature since contact blades 33 and 34 are both disengaged from their associated contacts 35 and 36. Relay coil 18 is deenergized and the gas valve 16 is closed. Electrical heater 41 is deenergized and the bimetallic strip 39 is relatively cool so that it is separated from contact 38 a substantial distance. If the temperature of the room or space should now fall, contact blades 33 and 34 will move towards the associated contacts 35 and 36. When this temperature condition reaches a predetermined value, contact blade 33 will engage contact 35. At this time, however, contact blade 34 is not engaging contact 36.

Engagement of contact blade 33 with contact 35 energizes the electrical heater 41 by a circuit as follows: secondary 43, wire 70, wire 71, switch arm 59, switch arm 60, wire 72, contact 35, contact blade 33, bimetallic element 31, wire 73, wire 74, switch arm 20, contact 22, wire 75, electrical heater 41, wire 76, wire 77, wire 78, wire 79, relay coil 18, and wire 80 to the other side of secondary 43. This series circuit through electrical heater 41 and relay coil 18 permits sufficient current to flow through electrical heater 41 to heat bimetallic strip 39 but does not energize relay coil 18 sufficiently to attract armature 19. If desired, the upper end of electrical heater 41, instead of being connected to the secondary 43 through the relay coil 18 as described above, may be directly connected to the secondary 43. In either event, engagement of contact blade 33 with contact 35 results in energization of electrical heater 41. Now, if due to vibration or other disturbances, contact blade 33 should occasionally or rapidly separate and reengage contact 35, the only result will be that a longer time will be required to raise the temperature of bimetallic strip 39 sufficiently to cause it to engage contact 38. After a time period, depending on whether or not contact blade 33 remains in constant engagement with contact 35 and depending upon other conditions which will be explained hereinafter, bimetallic strip 39 engages contact 38. By the time this amount of heating of bimetallic strip 39 has taken place, the temperature of the room or space 10 will have lowered sufficiently to maintain contact blade 33 and contact 35 in firm engagement.

Engagement of these parts causes energization of relay coil 18 by a circuit as follows: secondary 43, wire 70, wire 71, switch arm 59, switch arm 60, wire 72, contact 35, contact blade 33, bimetallic element 31, wire 73, wire 82, bimetallic strip 39, contact 38, wire 83, wire 77, wire 78, wire 79, relay coil 18 and wire 80 to the other side of secondary 43. The relay coil 18 is now operatively energized and attracts armature 19 so as to move switch arm 20 from engagement with contact 22 and into engagement with contact 23, as well as to move switch arm 21 into engagement with contact 24. Engagement of switch arm 21 with contact 24 energizes gas valve 16 by the circuit set out above whereupon heat is delivered to the room or space 10. Disengagement of switch arm 20 from contact 22 interrupts the energizing circuit for electrical heater 41, it being noted that this electrical heater 41 was temporarily short circuited by engagement of bimetallic strip 39 with contact 38. Engagement of switch arm 20 with contact 23 establishes a new circuit for relay coil 18 which is controlled by the contact blade 33 and contact 35 and independently of the time switch formed by bimetallic strip 39 and contact 38. This new or holding circuit for relay coil 18 is as follows: secondary 43, wire 70, wire 71, switch arm 59, switch arm 60, wire 72, contact 35, contact blade 33, bimetallic element 31, wire 73, wire 74, switch arm 20, contact 23, wire 79, relay coil 18 and wire 80 to the other side of secondary 43.

The relay coil 18 now remains energized until such time as the temperature of the room or space 10 has been raised sufficiently to cause movement of contact blade 33 from engagement with contact 35. When this occurs, the relay coil 18 is immediately deenergized since it is now controlled entirely by contact blade 33 and contact 35 and independently of the timer switch. During this period of operation, under all normal conditions, the bimetallic strip 39 will have cooled down to its normal temperature wherefore reengagement of contact blade 33 and contact 35, even though occurring substantially immediately after separation thereof, cannot cause reenergization of relay coil 18 except through the time delay apparatus provided by the thermal time switching mechanism.

Under normal conditions, the time delay between engagement of contact blade 33 with contact 35 and energization of relay coil 18, interposed by the thermal timing mechanism, will be shorter than the indefinite time required for the room or space temperature to fall sufficiently further to bring contact blade 34 into engagement with contact 36. However, under abnormal conditions, it is possible that the rate of temperature change in the room or space may be so large as to cause engagement of contact blade 34 with contact 36 prior to engagement of bimetallic strip 39 with contact 38. If this should occur, relay coil 18 is energized immediately irrespective of the condition of the time switch. This energizing circuit for relay coil 18 is as follows: secondary 43, wire 70, wire 71, switch arm 59, switch arm 60, wire 72, contact 35, contact blade 33, contact blade 34, contact 36, wire 85, wire 86, wire 78, wire 79, relay coil 18, and wire 80 to the other side of secondary 43. Energization of relay coil 18 in this manner again causes energization of the gas valve 16, causes deenergization of the electric heater 41 and establishes the aforementioned holding circuit for relay coil 18 which is controlled entirely by contact blade 33 and contact 35. The relay coil 18 will therefore remain energized after separation of contact blade 34 from contact 36 and until contact blade 33 disengages contact 35.

As the outdoor temperature conditions vary so as to cause a greater heat loss from the room or space 10, it will be evident that the heater 11 will operate for longer and longer periods. Under these conditions, as is well known, the temperature of the basement or room 14 in which the heater 11 is located tends to rise, although no heat is ordinarily furnished directly thereto through the medium of a register. The bimetallic strip 39 being located in this room or basement 14 therefore becomes warmer and requires less heating in order to cause engagement thereof with the contact 38. In this manner, as the outdoor temperature conditions becomes more severe, the time delay between engagement of contact blade 33 with contact 35 and the energization of relay coil 18 is decreased. This provides a very simple means of varying the control action of the thermostatic strip 39 upon the control system upon variations in outdoor temperature and does not require any separate means whatsoever responsive to changes in the outdoor temperature or other outdoor conditions.

Whenever the main operating shaft 56 of the timing mechanism 50 moves to a position in which the switch arm 59 rides upon the dwell 62, then the switch arm 59 disengages switch arm 60 and none of the low voltage circuits herein before traced can be completed. As a result, during the night or during non-working hours, the thermostatic mechanism 30 is prevented from controlling relay coil 18. It is undesirable, however, to completely shut down the heating plant even during the night or during non-working hours for long periods of time. During this time, the fingers 68 of cam 58 intermittently lift the switch arm 65 into engagement with switch arm 66. Whenever these switch arms engage, relay coil 18 is energized by a circuit as follows: secondary 43, wire 70, wire 87, switch arm 66, switch arm 65, wire 88, wire 86, wire 78, wire 79, relay coil 18 and wire 80 to the other side of secondary 43. As a result, during the night or during non-working hours, the relay coil 18 is intermittently energized to cause intermittent opening of gas valve 16, wherefore heat is furnished to the room or space 10 for short periods continuously during that time in which the thermostatic mechanism is unable to control the heating plant.

From the foregoing, it will be seen that the provision of a timer operated starting switch, the timing means of which is placed in operation upon engagement of contact blade 33 with contact 35, provides a means of obviating "relay chatter" without sacrificing greatly the sensitivity of the controlling thermostat 30 as would be the case if a snap-action mechanism or the like were utilized therein. Furthermore, provision is made to prevent an undue delay in the event the rate of temperature change is so great as to cause a good, firm contact between contact blade 33 and contact 35 before the timing period has elapsed. This is provided by means of the auxiliary contact blade 34 and the associated contact 36 which constitute a second control switch. Furthermore, returning of the control of the relay coil 18 directly to the contact blade 33 and contact 35 and entirely independent of the timing switch also materially helps in retaining the sensitivity of the thermostatic control mechanism. Returning of the timing mechanism to its normal position after it has fulfilled its function of permitting initial energization of the relay coil 18, by deenergizing the electrical heater 41, practically insures that there will always be a substantially constant period of delay between the engagement of contact blade 33 with contact 35 and the energization of relay coil 18.

In addition, the system of this invention provides other desirable features such as the intermittent control of the heating means during the night or during non-working hours and the variation of the time delay as the result of changes in outdoor atmospheric conditions.

While I have shown the time delay device as including a heating element and a bimetallic element subjected to the effect thereof, it is to be understood that such device may take any form whatsoever so long as it operates to delay the effect of the thermostatic means upon the device controlled by it.

It will also be evident that a number of other changes may be made in the details illustrated herein without departing from the invention exemplified thereby and I am therefore to be limited only in accordance with the scope of the appended claims.

I claim:

1. In combination, a sensitive movable member responsive to changes in a condition, first and second control switches sequentially closed thereby upon movement of said movable member in a single direction, a starting switch, electrical means to close said starting switch, a circuit for said electrical means controlled by the control switch which closes first, electrical mechanism to be controlled, a first energizing circuit for the electrical mechanism controlled by the control switch which closes first and starting switch in series, and a second energizing circuit for the electrical mechanism controlled by said control switch which closes last.

2. In combination, a sensitive movable member responsive to changes in a condition, first and second control switches sequentially closed thereby upon movement of said movable member in a single direction, a starting switch, electrical means to close said starting switch, a circuit for said electrical means controlled by the control switch which closes first, electrical mechanism to be controlled, a first energizing circuit for the electrical mechanism controlled by the control switch which closes first and starting switch in series, a second energizing circuit for the electrical mechanism controlled by the control switch which closes last, a holding switch moved to closed position by said electrical mechanism, and a holding circuit for said electrical mechanism controlled by the control switch which closes first and said holding switch in series.

3. In a heating system, in combination, a heater for heating a space, electrical means in control of the heater, a sensitive thermostat responsive to space temperature and including a control switch that closes with light contact pressure when the space temperature falls to a given value, time delay means, a circuit for the time delay means controlled by said control switch, a time switch closed by said time delay means after energization thereof, a circuit for said electrical means controlled by said control switch and time switch, means to open said time switch after closing thereof, a holding switch closed by said electrical means when energized, and a holding circuit for the electrical means controlled by said control switch and holding switch in series.

4. In a control system, in combination, a control switch, a first timer, a first timer switch closed thereby when energized, electrical means to be controlled, a circuit for the first timer controlled by said control switch, a second timer, a second timer switch moved to open position thereby for a relatively long time period, a circuit for said electrical means controlled by said first and second timer switches and said control switch in series, a holding switch moved to closed position by said electrical means when energized, a holding circuit for said electrical means controlled by said second timer switch, control switch and holding switch in series, means to cause opening of said first timer switch after closing thereof, a third timer switch opened and closed a plurality of times by said second timer while said second timer switch is open, and a circuit for said electrical means controlled by said third timer switch.

5. In an electric control system for placing a condition changer into or out of operation in accordance with variations in a condition to be controlled, comprising in combination, a condition responsive device, switching means operated by said condition responsive device, said switching means being moved to closed position when the condition to be controlled approaches a value requiring operation of the condition changer, a time delay device including a timer and a timer switch actuated to closed position after a predetermined period following energization of said timer, an energizing circuit for said timer controlled by said switching means for energizing said timer upon movement of said switching means to closed position, an energizing circuit for said condition changer controlled by said timer switch for placing said condition changer into operation after expiration of said predetermined period, means for opening the energizing circuit for said timer to cause the opening of said timer switch when the condition changer is placed into operation, and means controlled by said switching means for placing said condition changer out of operation when said switching means is moved to open position by said condition responsive means.

6. In an electric control system for placing a condition changer into or out of operation in accordance with variations in a condition to be controlled, comprising in combination, a condition responsive device, switching means operated by said condition responsive device, said switching means being moved from a first position to a second position when the condition to be controlled approaches a value requiring operation of the condition changer, a time delay device including a timer and a timer switch actuated thereby, an energizing circuit for said timer controlled by said switching means in a manner to initiate operation of said timer when said switching means is moved to said second position, means controlled by said timer switch for placing said condition changer into operation upon actuation of said timer switch by said timer, means controlled by said condition responsive device for maintaining said condition changer in operation independently of said timer switch after starting of said condition changer by said timer switch, and means for returning said timer switch to its initial position after starting of said condition changer.

7. In a control system for placing a condition changer into and out of operation in accordance with variations in a condition to be controlled, comprising in combination, condition responsive means, a controller operated by said condition responsive means, said controller being moved from a first position to a second position when the condition to be controlled varies to a value requiring a change in operation of said condition changer, a time delay device including a timer and a timer controller arranged to be actuated after a predetermined period following actuation of said timer, means actuated by said first controller upon actuation thereof by said condition responsive means for actuating said timer, means actuated by said timer controller for varying the condition changing effect of said condition changer upon the expiration of said predetermined period, means for maintaining the operation of the condition changer independently of the timer controller, and means for returning said timer controller to its original position after the operation of said condition changer is changed by said timer controller.

8. In a temperature changing system for controlling the temperature in a space, in combination, a temperature changer, thermostatic means responsive to the space temperature, first switching means for placing said thermostatic means into and out of control relationship with said temperature changer, second switching means for placing said temperature changer into operation independently of said first switching means and said thermostatic means, and timing means controlling said first and second switching means to maintain said first switching means closed and said second switching means open during one portion of the day, and to maintain said first switching means open and intermittently close said second switching means during another portion of the day.

9. In an electric control system for placing a condition changer into or out of operation in accordance with variations in a condition to be controlled, comprising in combination, a condition responsive device, switching means operated by said condition responsive device, said switching means being moved from a first position to a second position when the condition to be controlled approaches a value requiring operation of the condition changer, a time delay device including a timer and a timer switch actuated thereby, an energizing circuit for said timer controlled by said switching means in a manner to initiate operation of said timer when said switching means is moved to said second position, means controlled by said timer switch for placing said condition changer into operation upon actuation of said timer switch by said timer, means controlled by said condition responsive device for maintaining said condition changer in operation independently of said timer switch after starting of said condition changer by said timer switch, and means for rendering said timer switch inoperative to maintain the condition changer in operation after starting thereof, whereby said condition changer is placed out of operation when said condition responsive device becomes satisfied.

10. In a control system for placing a condition changer into and out of operation in accordance with variations in a condition to be controlled, comprising in combination, condition responsive means, a controller operated by said condition responsive means, said controller being moved from a first position to a second position when the condition to be controlled varies to a value requiring a change in operation of said condition changer, a time delay device including a timer and a timer controller arranged to be actuated after a predetermined period following actuation of said timer, means actuated by said first controller upon actuation thereof by said condition responsive means for actuating said timer, means actuated by said timer controller for varying the condition changing effect of said condition changer upon the expiration of said predetermined period, means controlled by said condition responsive device for maintaining the operation of the condition changer independently of the timer controller, and means for rendering said timer controller inoperative to maintain the operation of the condition changer after change in operation thereof, whereby said condition responsive device rendered capable of changing the operation of the condition changer in the reverse direction.

11. In a condition control system, in combination, condition changing means for maintaining proper atmospheric conditions in a space to be conditioned, electrical means in control thereof, a control switch responsive to a condition, a time delay device including a timer and a timer switch actuated thereby a timed period following starting of said timer, circuit means for said electrical means controlled by said timer switch and said control switch, said circuit means being arranged so that said control switch may stop said condition changer independently of said timer switch, a circuit for said timer controlled by said control switch in a manner to start said timer upon actuation of said control switch, said control switch being actuated in response to said condition in a manner to start said timer upon demand for change in said condition, said time delay device acting upon starting of the timer thereof to prevent actuation of said electrical means by said control switch, and said timer switch being actuated by said timer at the end of said timed period for actuating said electrical means, and means influenced by an atmospheric condition to vary the time required by said timer for actuating said timer switch.

12. In a heating control system, in combination, a heater in a first space for supplying heat to a separate space, the space in which the heater is located increasing in temperature as the output of the heater is increased, a burner for said heater, electrical means in control of said burner adapted to place said burner into and out of operation, a thermo-electric timer having a heating element, a thermostatic element influenced by the heating element, and a timer switch controlled by said thermostatic element, a circuit controlled by said timer switch for controlling said electrical means, said thermo-electric timer acting in a manner normally to prevent operation of said burner when said timer is started, while placing said burner into operation when the timer switch thereof is actuated at the expiration of a timed period, a thermostat responsive to the temperature of said separate space for starting said timer upon demand for heat, said thermo-electric timer being located in the space in which the heater is located and being arranged so that the period timed by said thermo-electric timer is shortened as the temperature in said last mentioned space is increased, for thereby starting the burner at shorter and shorter intervals following demand for heat by the thermostat as the outside temperature decreases.

13. In a condition control system, in combination, condition changing means for maintaining proper atmospheric conditions in a space to be conditioned, electrical means in control thereof, a control switch responsive to a condition, a time delay device including a timer and a timer switch actuated thereby a timed period following starting of said timer, circuit means for said electrical means controlled by said timer switch and said control switch, said circuit means being arranged so that said control switch may stop said condition changer independently of said timer switch, a circuit for said timer controlled by said control switch in a manner to start said timer upon actuation of said control switch, said control switch being actuated in response to said condition in a manner to start said timer upon demand for change in said condition, said time delay device acting upon starting of the timer to prevent actuation of said electrical means by said control switch, and said timer switch being actuated by said timer at the end of said timed period for actuating said electrical means.

14. In a condition control system in combination, condition changing means for maintaining proper atmospheric conditions in a space to be conditioned, electrical means in control thereof, a control switch responsive to a condition, a time delay device including a timer and a timer switch actuated thereby a timed period following starting of said timer, circuit means for said electrical means controlled by said timer switch and said control switch, said circuit means being arranged for causing the control switch to maintain the condition changer in operation independently of said timer switch, a circuit for said timer controlled by said control switch in a manner to start said timer upon actuation of said control switch, said control switch being actuated in response to said condition in a manner to start said timer upon demand for change in said condition, said time delay device acting upon starting of the timer to prevent actuation of said electrical means by said control switch, and said timer switch being actuated by said timer at the end of said timed period for actuating said electrical means.

WILLIAM W. STUART.